Nov. 6, 1934.  I. O. PEDERSEN ET AL  1,979,573
GLASS ARTICLE
Original Filed Jan. 30, 1933
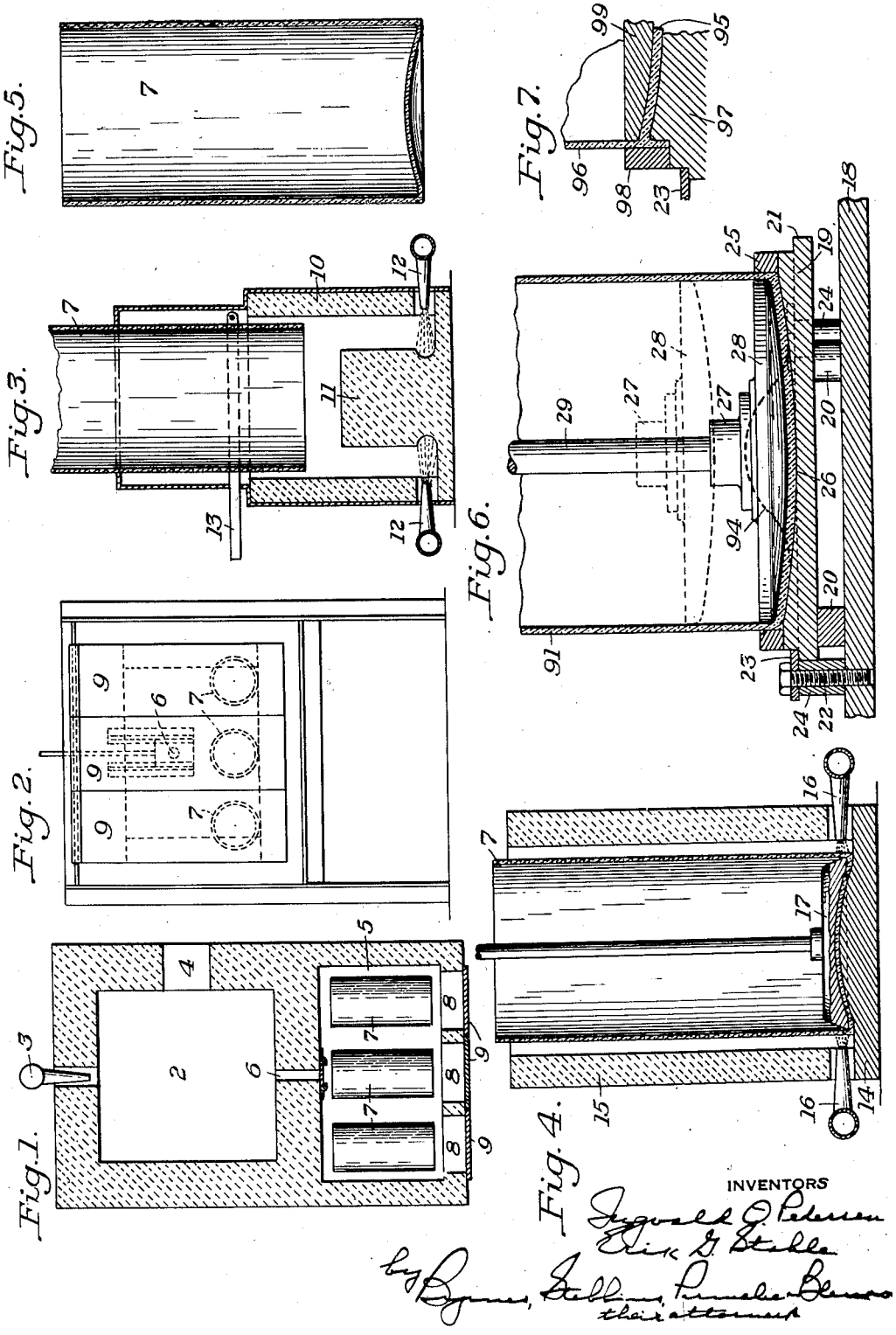
INVENTORS Patented Nov. 6, 1934

1,979,573

UNITED STATES PATENT OFFICE 1,979,573

GLASS ARTICLE

Ingvald O. Pedersen, Pittsburgh, Pa., and Erik G. Stahle, Lumberport, W. Va., assignors to Clarence P. Byrnes, Sewickley, Pa., trustee Original application January 30, 1933, Serial No. 654,122. Divided and this application December 4, 1933, Serial No. 700,788

4 Claims. (Cl. 215—1)

Our invention relates to glass articles, and more particularly containers or receptacles having glass sides and bottoms, especially those of larger size. An object of the invention is to provide an improved glass container or receptacle.

The invention is particularly adapted for the use of cylinders or other hollow shapes formed by the Pedersen process set forth in the copending application of Ingvald O. Pedersen Serial No. 366,787, although containers or receptacles in accordance therewith may be made by using bottomless glass cylinders or glass body members formed in any way. This application is in part a continuation of our copending application Serial No. 540,600 and a division of our copending application Serial No. 654,122.

In the accompanying drawing we have shown certain present preferred embodiments of the invention, in which Figure 1 is a horizontal section of a day tank or furnace for melting glass and preheating glass cylinders;

Figure 2 is an end view of the tank or furnace shown in Figure 1;

Figure 3 is a vertical section showing a glory hole furnace for raising the temperature of an end portion of a glass cylinder;

Figure 4 is a diagrammatic vertical section showing a method of forming and welding glass bottoms to cylinders;

Figure 5 is a partial vertical section of a finished article;

Figure 6 is a diagrammatic vertical section to enlarged scale showing a modified method of forming a glass bottom and welding the same to a cylinder; and Figure 7 is a fragmentary vertical section similar to Figure 6 showing a modified construction.

Figures 1 and 2 show a day tank 2 having heating means 3, a ladling hole 4 through which the glass is withdrawn, and a preheating compartment 5 to which glass body members, such, for example, as cylinders severed from a drawn length and preferably having ground ends, are taken for warming up. 6 represents a valved passageway from above the glass bath in the day tank to the preheating chamber 5; 7 representing cylinders lying therein. These cylinders may be introduced through apertures 8 having adjustable closures 9. After thus warming up the cylinder to preferably about 300° F., one end of each cylinder is raised to or to near the welding temperature by a glory hole or other furnace.

Figure 3 shows one form of glory hole furnace comprising an enclosure 10 having a base with central boss 11 and gas burners 12 projecting in through openings in the side walls. The glass cylinder 7 is shown as being gradually lowered toward the source of heat by suitable hand tongs or clamps 13.

Any desirable form of furnace may be used, so as to bring an end portion of each cylinder to a very much higher temperature than the remainder of the cylinder. This reheated end is preferably brought to or above 1200° F. in this step.

After thus heating an end portion of a glass cylinder, the cylinder may be positioned with such end upon the bottom of a cast iron mold 14, which may have enclosing sides 15. Around the wall of this mold, just above its bottom, are provided heating burners 16, projecting thereinto. The hot end of the cylinder seats upon the mold bottom which closes its end. Molten glass is then fed into the interior of the cylinder and drops upon the mold bottom, being ladled in to a desirable amount. As soon as the molten glass is ladled in, a cast iron plunger 17 of the proper temperature below the sticking point is forced down upon the glass within the cylinder to force it out into contact with the inside of the hot cylinder end portion. As shown in Figures 4 and 5, the mold bottom may be of somewhat convex form, the end of the plunger being correspondingly concaved, this being found to aid in the after-annealing. The mold bottom and plunger may, however, be of any desirable shape, certain advantages arising by making the mold concave, as will presently be explained.

As the molten glass is forced out against the wall of the cylinder it welds with the hot cylinder glass and thus produces substantially a one-piece receptacle, a portion of which is shown in Figure 5. Such articles are then annealed in suitable annealing leers.

Referring now more particularly to Figure 6, there is provided a cast iron base plate 18 upon which is mounted a mold 19 which is spaced above the base plate by spacers 20. The mold 19 has a peripheral flange 21 and spaced thereabout are a plurality of bolts 22 each passing through a keeper 23 overlying the flange 21, each such bolt passing through a collar 24 standing upright on the base plate 18, so that each keeper 23 rests upon the corresponding collar 24, and being threaded into the base plate, thereby securely positioning the mold 19 as shown.

Mounted atop the mold 19 is a cast iron ring 25 which may be fastened to the mold in any appropriate manner. Within the ring 25 the upper or molding surface of the mold is made concave, as shown at 26. In Figure 6 the concavity is shown as extending to a point spaced inwardly of the inner surface of the ring 25, but such concavity may, if desired, extend all the way to the inner surface of such ring. The concavity is preferably uniform about the center of the molding surface.

Adapted to cooperate with the mold 19 is a plunger 27 having a head 28 and a stem 29. The bottom of the head of the plunger is made convex, the degree of curvature being substantially the same as that of the concave molding surface 26. The external diameter of the plunger head 28 is preferably somewhat smaller than the internal diameter of the ring 25, the difference being preferably slightly greater than twice the thickness of the glass of a glass body member, such as a cylinder, which may be used in the formation of a receptacle.

There is provided a drawn glass cylinder having an exterior fire polish. Such cylinder, as above mentioned, may be formed by the Pedersen process, although cylinders formed by other processes, as well as non-cylindrical lengths formed by the Pedersen process, or otherwise, may be utilized. Lengths formed by the Pedersen process are particularly adaptable for our purposes, as they are sized while being drawn and are of uniform size throughout, within commercial tolerances. This is important when receptacles of predetermined capacity are to be manufactured in quantity.

The drawn glass length, which for purposes of illustration will be considered as cylindrical, is cut into shorter lengths in well known manner and each such shorter length preferably has its ends ground. One of such lengths 91 (Figure 6) has one of its ends heated substantially to the welding temperature and preferably to or above 1200° F. either in a furnace such as shown in Figure 3, or otherwise, care being exercised to bring the end of the cylinder to the desired temperature slowly and evenly.

Such cylinder with its heated end downward is positioned within the ring 25 and upon the mold 19, as shown in Figure 6. Either immediately before or immediately after the positioning of the cylinder upon the mold a mass of molten glass, indicated by the dotted line 94 in Figure 6, is deposited on the concave molding surface 26. At such time the plunger 27 is raised up out of the way so that its head is well above the top of the cylinder 91.

The plunger is then moved downwardly so that its head enters the top of the cylinder 91. The diameter of the plunger head is such that it substantially fills the entire area within the cylinder while not fitting so tightly as to prevent its free downward movement therein. The plunger is moved downwardly, provision being made for applying the necessary force thereto, and spreads out the molten glass over the concave molding surface 26, forcing the outer portion of the glass into contact with the inside of the hot end of the cylinder and welding the same thereto, forming a substantially unitary glass article. By reason of the concavity of the molding surface, the molten glass is forced to run slightly uphill, which enables the close control of the glass and avoids the possibility of its flowing too freely away from the center of the mold and producing a closure or bottom for the cylinder which is thinner at its center than at its periphery, and also insures substantially even distribution of the glass about the center of the mold. This provision, as well as the provision of the ring 25, also avoids distortion of the hot end of the cylinder when the molten glass flows against it from within.

The words "concave" and "concavity", referring to the shape of the mold and closure, are used as words of broad definition and not of limitation and are intended to comprehend molds and closures of the general character in question, whether actually having concavely curved surfaces or not. The surfaces may be other than concavely curved while still having the same general function of those herein described for purposes of illustration.

The bottom or closure is preferably made thicker than the body of the container. This enables the bottom to withstand heavy strains and also provides for a greater area of contact between the bottom and the body of the container when the bottom is formed within the container, as shown in Figure 6.

In Figure 7 is shown a modified construction in which the closure 95 is connected with the body 96 above the bottom of the body so that when the container is set down it will stand firmly upon the bottom of the body wall. This would not be true of the form shown in Figure 6, although such form is primarily intended for use in connection with a casing to form a composite receptacle, such, for example, as that disclosed in the copending application of Ingvald O. Pedersen, Serial No. 563,080. In Figure 7 the mold takes the form shown at 97, a ring 98 similar to the ring 25 of Figure 6 being used in cooperation with a plunger 99.

The glass bottoms may be formed to shape before the welding operation. The glass bottom may be welded to the end of the hollow article instead of to the inner portions of its end side walls and the mold made without side walls, although we prefer to force the glass against the inner side walls of the end portion.

The cross sectional shape of the hollow glass length may be square or of other polygonal shape, the means for carrying out the steps may be varied, and many other changes may be made without departing from our invention.

The advantages of our invention will be obvious to those skilled in the art, since a cheap and effective method is provided which results in improved glass receptacles, especially those of larger size.

While we have shown and described certain present preferred embodiments of the invention, it is to be distinctly understood that the same is not limited thereto, but may be otherwise variously embodied within the scope of the following claims.

We claim:

1. As a new article of manufacture, a glass receptacle consisting of a bottomless glass article with an external fire polish having a pressed glass bottom with its edges welded to the inner end of the side wall of the article.

2. As a new article of manufacture, a glass receptacle consisting of a bottomless glass article with an external fire polish having a pressed glass bottom of thicker glass with its edges welded to the inner end of the side wall of the article.

3. As a new article of manufacture, a glass receptacle consisting of a bottomless glass article with an external fire polish having a pressed inwardly concave glass bottom with its edges welded to the inner end of the side wall of the article.

4. As a new article of manufacture, a glass receptacle consisting of a hollow body of drawn glass with an external fire polish and a pressed glass bottom of thicker glass with its edges welded to the inner sides of the end portion of the body.

INGVALD O. PEDERSEN.
ERIK G. STAHLE.